United States Patent [19]

Miller et al.

[11] Patent Number: 4,600,203

[45] Date of Patent: Jul. 15, 1986

[54] SLIT-TYPE SEALING ARRANGEMENT FOR ENCAPSULATED MEASURING SYSTEM

[75] Inventors: Walter Miller, Traunstein; Heinz Kraus, Traunreut, both of Fed. Rep. of Germany

[73] Assignee: Dr. Johannes Heidenhain GmbH, Traunreut, Fed. Rep. of Germany

[21] Appl. No.: 713,481

[22] Filed: Mar. 19, 1985

[30] Foreign Application Priority Data

Mar. 24, 1984 [DE] Fed. Rep. of Germany ....... 3410944

[51] Int. Cl.⁴ .................. F16J 15/16; F16J 15/32; G01B 11/04
[52] U.S. Cl. .................. 277/237 R; 277/12; 277/DIG. 7; 33/125 R; 33/125 C
[58] Field of Search ........... 33/125 R, 125 A, 125 C, 33/125 T; 277/DIG. 7, 237, 12, 32

[56] References Cited

U.S. PATENT DOCUMENTS

| | | |
|---|---|---|
| 3,418,756 | 12/1968 | Baughman et al. ...... 277/DIG. 7 X |
| 3,939,576 | 2/1976 | Lawrence ................ 277/DIG. 7 X |
| 4,136,958 | 1/1979 | Nelle . |
| 4,170,829 | 10/1979 | Nelle ..................... 33/125 R |

FOREIGN PATENT DOCUMENTS

| | | |
|---|---|---|
| 2216994 | 10/1973 | Fed. Rep. of Germany ...... 277/205 |
| 2623526 | 7/1977 | Fed. Rep. of Germany . |
| 66731 | 9/1943 | Norway ............................... 277/83 |
| 268391 | 6/1928 | United Kingdom ......... 277/DIG. 7 |
| 396061 | 7/1933 | United Kingdom ......... 277/DIG. 7 |
| 1049947 | 11/1966 | United Kingdom ......... 277/DIG. 7 |
| 1441197 | 6/1976 | United Kingdom ......... 277/DIG. 7 |

Primary Examiner—Robert S. Ward
Attorney, Agent, or Firm—Willian, Brinks, Olds, Hofer, Gilson & Lione Ltd.

[57] ABSTRACT

An encapsulated measuring system includes a follower coupled to a scanning unit which extends through a slit in a housing of the measuring system. This slit is sealed against lubricants and coolants by a pair of multipart sealing elements. Each multipart sealing element includes a sealing profile proper, along with a supporting element. The sealing profiles perform the sealing function, and the supporting elements provide the necessary permanent elasticity and stability of form. Because of this division of function, the sealing profiles themselves can be made of materials that are resistant to aggressive media such as lubricants and coolants, but themselves do not provide sufficient elasticity or stability of form to be used alone.

10 Claims, 4 Drawing Figures

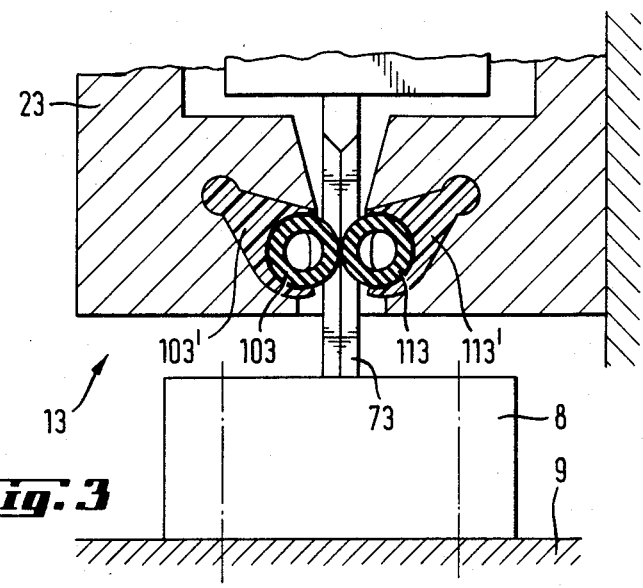
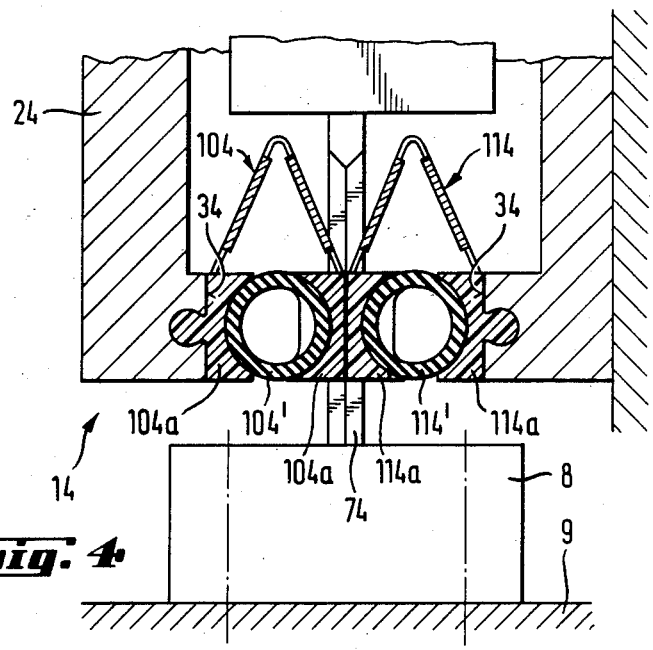

SLIT-TYPE SEALING ARRANGEMENT FOR ENCAPSULATED MEASURING SYSTEM

BACKGROUND OF THE INVENTION

This invention relates to an improved sealing arrangement for an encapsulated measuring system for measuring the position of first and second objects movable with respect to one another, of the type which includes a housing adapted to be connected to the first object, which housing defines a slit extending along the measuring direction, a scanning unit disposed in the housing, and a follower, adapted to be connected to the second object and coupled to the scanning unit to extend through the slit.

A wide variety of such measuring systems are known to the art. By way the example, German Patent DE-PS No. 26 23 526 discloses an example of a length measuring system of this type.

In this system the sealing lips which close the slit in the housing are arranged in a roof form and are formed of an elastic synthetic material. The sealing lips abut one another with a sealing effect in order to seal the interior of the housing. The sealing lips are spread apart in a limited region where the follower extends between the sealing lips in order to conform to the contour of the follower. Such sealing is provided for measuring systems in order to prevent harmful environmental influences from damaging or interfering with the operation of measuring of components arranged in the interior of the housing.

Often, when such measuring systems are installed on machine tools, the measuring systems come into contact with fluids such as coolants and lubricants that must be kept out of the interior of the measuring device by the sealing lips. Such fluids can attack the material of which the sealing lips are formed, thereby causing the sealing lips to swell so that their length changes. In addition, some of the fluids are sufficiently aggressive to adversely alter the sliding or frictional properties of the sealing lips.

In the event aggressive fluids present in the machine tool environment cause the sealing lips to swell, the lips tend to dispose themselves in an undulating pattern which causes the sealing properties of the sealing lips to deteriorate. In some cases, the surface of the sealing lips may be attacked in such a way that the friction between the sealing lips and the follower becomes unacceptably high.

SUMMARY OF THE INVENTION

The present invention is directed to an improved sealing arrangement for an encapsulated measuring system which, even after relatively long use under aggressive environmental influences, does not lose its sealing properties, so that the effective life of the sealing arrangement can be increased.

According to this invention, a measuring system of the type described initially above is provided with a pair of multipart sealing elements, each of which is mounted to the housing on a respective side of the slit. Each multipart sealing element comprises a sealing profile shaped to seal against the follower as well as an elastic supporting element shaped to bias the sealing profile into sealing engagement with the follower. The sealing profiles abut and seal against one another across the slit in order to seal the interior of the housing.

The sealing arrangement of this invention provides the important advantage that the interior of the housing is sealed in an effective manner, even in the event the sealing elements come into contact with aggressive agents such as cooling or lubricating fluids. The present invention provides improvements in sealing properties in such an environment, since the multipart sealing elements can be used to create a functional subdivision. The sealing profile proper cooperates with the follower to provide a low friction interface and high abrasion strength. The required permanent elasticity for the restoring forces and for form stability are provided by the elastic supporting elements. The dependent claims define further advantageous features of this invention.

The invention itself, together with further objects and attendant advantages, will best be understood by reference to the following detailed description, taken in conjunction with the accompanying drawings.

BRIEF DESCRIPTION OF THE DRAWINGS

FIG. 3 is a partial cross-sectional representation of a measuring instrument which incorporates a second preferred embodiment of this invention.

FIG. 4 is a partial cross-sectional representation of a measuring instrument which incorporates a third preferred embodiment of this invention.

DETAILED DESCRIPTION OF THE PRESENTLY PREFERRED EMBODIMENTS

Figure 1:
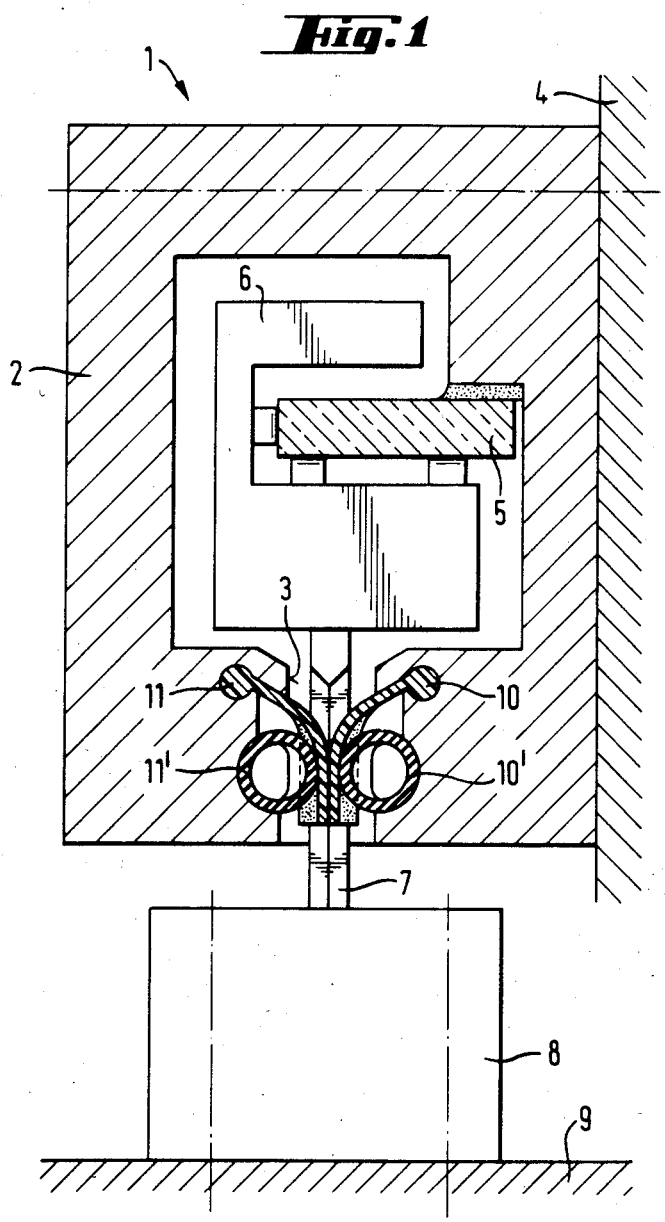
FIG. 1 is a schematic cross-sectional representation of a measuring system which incorporates a first preferred embodiment of the sealing arrangement of this invention.

Turning now to the drawings, FIG. 1 shows an encapsulated length measuring system 1 which incorporates a first preferred embodiment of this invention. This measuring system 1 includes a housing 2 which is closed on three sides and which defines on a fourth side a longitudinally extending slit 3. In FIG. 1, the housing 2 is fastened to a slide-piece 4 of a machine tool (not shown in detail) with the longitudinal slit 3 oriented downwardly.

A mesuring scale 5 is mounted to the interior of the housing 2, and this scale 5 defines a measuring graduation (not shown). The scale 5 is read in a known manner by a scanning unit 6 which is slidable along the interior of the housing 2 alongside the scale 5. In this specification in the following claims, the term "scanning unit" is used in its broad sense to encompass any system adapted to corporate with a scale to allow determination of relative position between the scanning unit and the scale. In FIG. 1 a follower 7 is mounted to the scanning unit 6, and this follower 7 defines a cross-section similar to that of a two-sided sword. The follower 7 projects out of the housing 2 through the slit 3 and is connected at its free end with a mounting base 8. The mounting base 8 is fastened to a bed 9 of the machine tool, thereby interconnecting the scanning unit 6 with the bed 9.

When the slide piece 4 is moved relative to the bed 9, the scale 5 moves along the scanning unit 6, thereby allowing the relative position between the bed 9 and the slide piece 4 to be measured and displayed as a measuring value.

In order to increase the cutting performance of a material removing tool, it is common practice in machine tools to utilize coolants or lubricants in order to achieve better working results.

Such liquids are selected to perform required cooling or lubricating functions and may well attack machine elements. Measuring systems of the type mentioned in the opening paragraph of this specification are high precision optical and/or electronic instruments which in general must be protected against such aggressive liquids. For this purpose, the longitudinal slit 3 is sealed off in the embodiment of FIG. 1 by multi-part sealing elements 10, 10′, 11, 11′.

Conventional sealing elements are arranged in roof form; however, as previously mentioned, such conventional sealing elements may lose their original sealing properties under the influence of aggressive liquids such as lubricants and coolants used in conjunction with machine tools.

The present invention provides an improved sealing arrangement by distributing or subdividing the several functions (in part contradictory) which the sealing elements must perform over several individual sealing element components. Because of this subdivision of functions, each of the sealing element components can be designed to fulfill its particular functions more optimally than possible when a one-piece sealing element is used, which must perform the various functions, thereby compromising its ability to perform any one of the functions.

The important characteristics of the sealing elements can be summarized as follows:

(1) Low friction and abrasion strength for the interaction between the sealing element and the follower; and (2) permanent elasticity and form stability to ensure secure and sealing engagement between the sealing elements across the longitudinal slit 3.

In the embodiment of FIG. 1, each of the two-part sealing elements 10, 10′; 11, 11′ includes a respective thin plate or sheet, 10, 11, one arranged on each side of the longitudinal slit 3. For example, these sealing elements may be made of polytetrafluoroethylene as an extrusion, and must only be cut to the appropriate length and drawn into position in the housing 1.

Since the sealing elements 10, 11 do not have sufficient stability of form or elasticity to provide the required sealing function, each is supported by a respective supporting element 10′, 11′ constructed as a flexible tube. The tubes 10′, 11′ provide the needed permanent elasticity and stability of form in order to hold the sealing elements 10, 11 in proper sealing contact with one another. The sealing elements 10, 11 are resistant to aggressive fluids in the machine tool environment, and the fact that the tubular supporting elements 10′, 11′ may change under the influence of these aggressive fluids is of no consequence whatever with respect to sealing properties of the sealing elements 10, 11. Thus, the surface quality of the supporting elements 10′, 11′, as well as whether or not the supporting elements 10′, 11′ are swollen, does not adversely affect the sealing of the sealing elements 10, 11. In this preferred embodiment, the supporting elements 10′, 11′ are made of a synthetic resilient material, and may be formed as silicone tubes. The tubes 10′, 11′ may be inflated in order to obtain the desired degree of elasticity.

Figure 2:
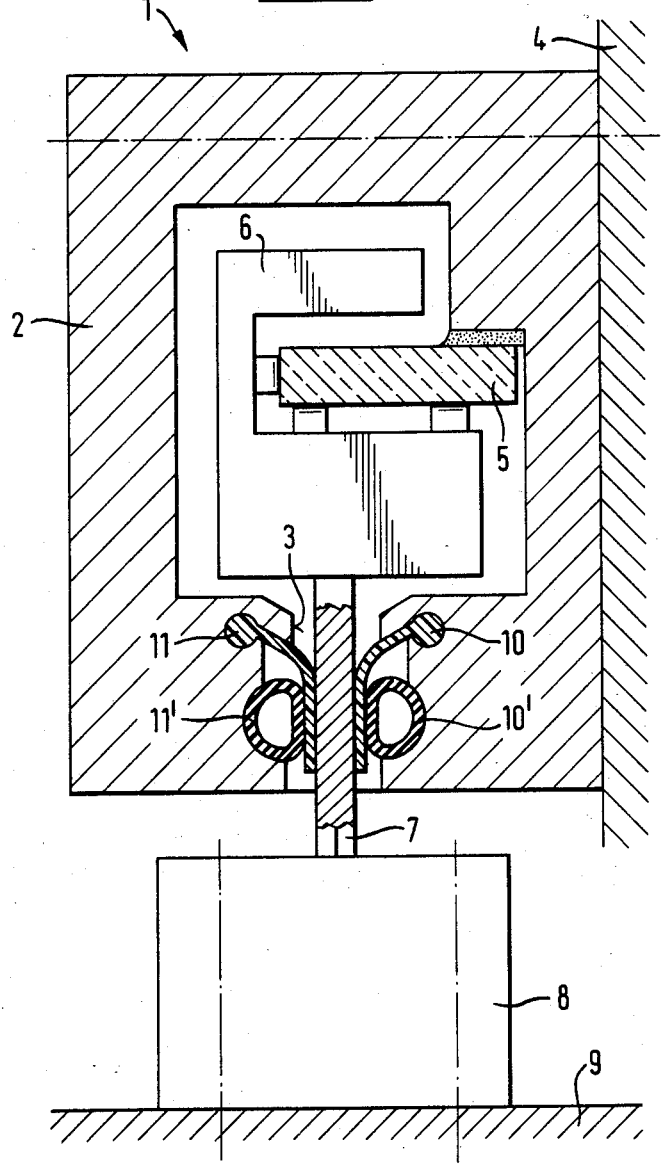
FIG. 2 is a cross-sectional view of the embodiment of FIG. 1, taken in a plane passing through the follower.

FIG. 2 shows the measuring system 1 of FIG. 1 at a section plane passing through the follower 7. The follower 7 passes between the sealing elements 10, 10′, 11, 11′ and spreads them apart. In the process, the tubes 10′, 11′ are deformed. The remaining components of FIG. 2 are identical to those of FIG. 1, and will not therefore be described in greater detail here.

FIG. 3 shows a partial sectional representation of a measuring system 13 which incorporates a second preferred embodiment of this invention. The standard components of this measuring system 13 are the same as those described above in conjunction with FIG. 1.

In the embodiment of FIG. 3, the sealing elements include in the first place supporting elements 103′ 113′, each of which is formed of a synthetic resilient material and is permanently elastic as well as stable in form. In this embodiment the sealing elements themselves are formed by the tubes 103, 113. These tubes 103, 113 can if desired to be inflated with pressurized air in order to vary the sealing characteristics. The interaction of the sealing elements 103, 113 with the elastic supporting elements 103′, 113′ provides particularly good sealing properties in the zone of the follower 73, since the sealing elements 103, 103′, 113, 113′ cling particularly closely to the follower 73.

The supporting elements 103′, 113′ are formed at their free ends in such a way that they largely enclose the tubes 103, 113. The zone of enclosure is greater than 180° and less than 360°, so that the tubes 103, 113 are held in closed form in the supporting profiles 103′, 113′, but the tubes 103, 113 are free to seal against one another directly. In this embodiment the tubes 103, 113 can readily be removed and replaced if desired.

FIG. 4 shows a partial sectional view of a measuring instrument 14 which incorporates a third preferred embodiment of this invention.

The measuring system 14 includes a housing 24 which defines a longitudinal slit 34. A sealing profile 104, 114 open on one side is drawn into a groove on the respective side of the longitudinal slit 34. The sealing profiles 104, 114 are shaped in the manner of the letter "V", each side of which carries on the side lying opposite the apex a cylindrically symmetric molded part 104a, 114a. The molded parts 104a, 114a serve to fasten the sealing profiles 104, 114 to the housing 24 and to receive the supporting elements 104′, 114′. The molded parts 104a, 114a enclose the supporting elements 104′, 114′ on the housing side and on the side of the longitudinal slit 34 where they are in sealing contact with one another. The supporting elements 104′, 114′ provide a resilient biasing force which maintains this sealing contact. The supporting elements 104′, 114′ are inflatable and thus adjustable with respect to their elasticity. In addition, since the supporting elements 104′, 114′ are constructed in the form of a tube, they can be changed in a remarkably simple manner when desired.

From the foregoing preferred embodiments it should be apparent that the present invention can be varied widely to suit particular applications. Thus, it should be clear that the foregoing detailed examples have been provided not to restrict the scope of this invention, but merely to clarify the presently preferred embodiments.

The housing 2, 23, 24 can be formed in the conventional manner as an extruded aluminum hollow profile, in which the receptacles for the sealing elements are directly formed during the extrusion process. In this way, additional working operations for producing fastening arrangements for the sealing elements can be avoided. Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which were intended to define the scope of this invention.

We claim:

1. In an encapsulated measuring system for measuring the position of first and second objects movable relative to each other, of the type comprising a housing, adapted to be connected to the first object, which defines a slit extending along a measuring direction, a scanning unit disposed in the housing, and a follower, adapted to be connected to the second object and coupled to the scanning unit to move along the measuring direction and to extend through the slit, said follower having a convex shape in the measuring direction, the improvement comprising:
  a pair of multipart sealing elements, each multipart sealing element mounted to the housing on a respective side of the slit to extend along the measuring direction, each multipart sealing element comprising a sealing profile shaped to seal against the follower and an elastic supporting element having a length dimension extending along the measuring direction and shaped to bias the respective sealing profile into sealing engagement with the follower;
  the sealing profiles positioned to abut and seal against one another across the slit; and
  said follower operating to indent the elastic supporting elements such that the elastic supporting elements are indented maximally in a region aligned with the follower, which region moves along the length of the supporting elements as the follower moves along the measuring direction.

2. The invention of claim 1 wherein each of the supporting elements comprises a respective flexible tube.

3. The invention of claim 1 wherein each of the supporting elements comprises a respective cylindrically symmetric element.

4. The invention of claim 1 wherein each of the sealing profiles comprises a respective tube.

5. The invention of claim 1 wherein the sealing profiles are disposed between the supporting elements.

6. The invention of claim 1 wherein each of the sealing profiles encloses the respective supporting element on several sides.

7. The invention of claim 4 wherein the tubes are disposed between the supporting elements.

8. The invention of claim 4 wherein each of the supporting elements extends around the respective tube by an amount greater than 180° and less than 360°.

9. The invention of claim 1 wherein the sealing profiles are formed of a first material adapted to seal the housing and to allow smooth sliding motion of the follower, and wherein the supporting elements are formed of a second material, different from the first material, adapted to bias the sealing profiles into sealing engagement.

10. In an encapsulated measuring system for measuring the position of first and second objects movable relative to each other, of the type comprising a housing, adapted to be connected to the first object, which defines a slit extending along a measuring direction, a scanning unit disposed in the housing, and a follower, adapted to be connected to the second object and coupled to the scanning unit to move along the measuring direction and to extend through the slit, said follower having a convex shape in the measuring direction, the improvement comprising:
  a pair of sealing strips, each secured to the housing on a respective side of the slit such that the sealing strips seal against one another across the slit and the follower passes between the sealing strips, said sealing strips formed of a first material adapted to seal the housing and to allow smooth sliding motion of the follower; and
  a pair of flexible, tubular supporting elements, each secured to the housing on a respective side of the slit and in contact with the respective sealing strip to bias the sealing strips into sealing engagement and into sealing engagement with the follower, said supporting elements formed of a second material, different from the first material, adapted to bias the sealing strips together, and each of said supporting elements defining a length dimension extending along the measuring direction;
  said follower operating to indent the supporting elements such that the supporting elements are indented maximally in a region aligned with the follower, which region moves along the length of the supporting elements as the follower moves along the measuring direction.

* * * * *